Figure 1:
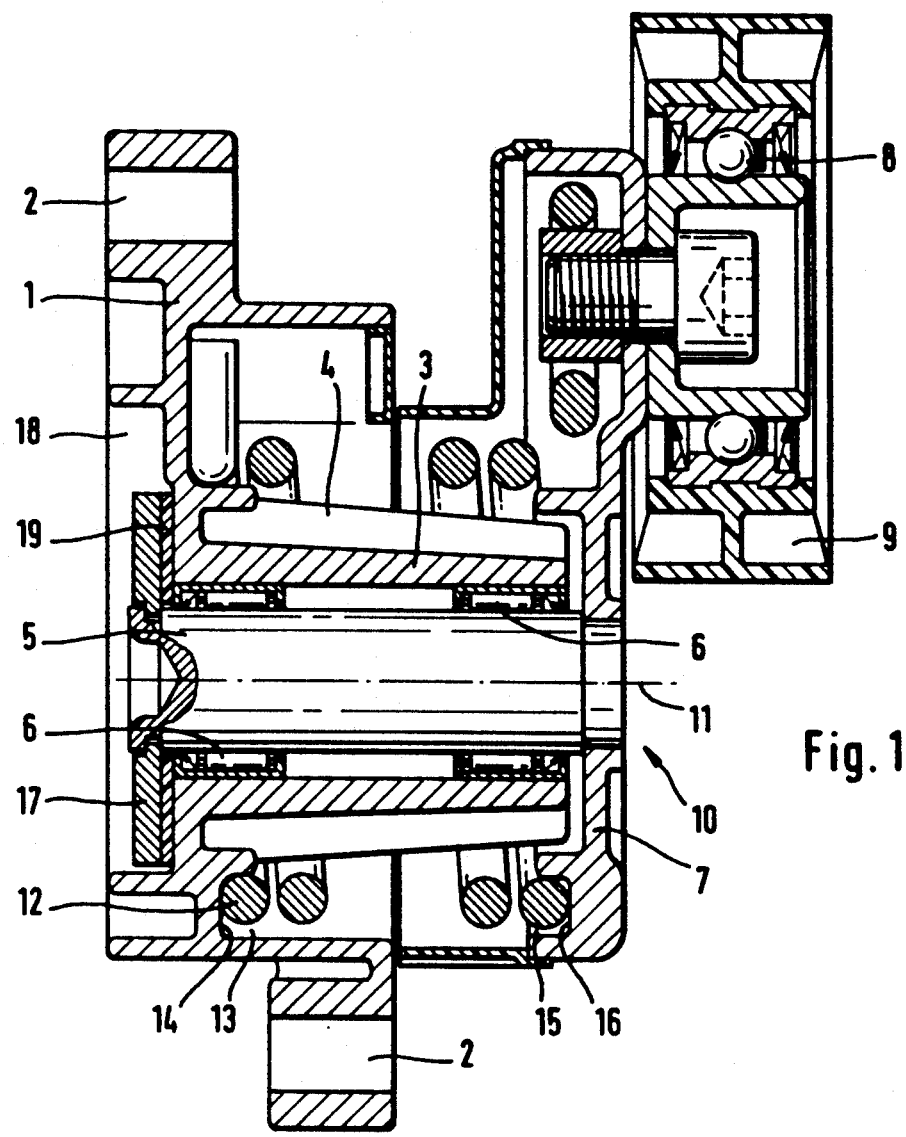

United States Patent [19]

Golovatai-Schmidt et al.

[11] Patent Number: 5,236,396

[45] Date of Patent: Aug. 17, 1993

[54] FRICTION DEVICE, IN PARTICULAR FOR BELT TENSIONERS

[75] Inventors: Eduard Golovatai-Schmidt, Nuremberg; Alfred Tonsmann, Herzogenaurach, both of Fed. Rep. of Germany

[73] Assignee: INA Walzlager Schaeffler KG, Fed. Rep. of Germany

[21] Appl. No.: 916,178

[22] Filed: Jul. 17, 1992

[30] Foreign Application Priority Data

Jul. 25, 1991 [DE] Fed. Rep. of Germany ....... 4124636

[51] Int. Cl.⁵ .............................................. F16H 7/08
[52] U.S. Cl. ..................................... 474/101; 474/135
[58] Field of Search ........ 474/101, 109, 111, 113–117, 474/133–138

[56] References Cited

U.S. PATENT DOCUMENTS 4,698,049 10/1987 Bytzek et al. ....................... 474/135
4,938,734 7/1990 Green et al. ....................... 474/135

*Primary Examiner*—Thuy M. Bui
*Attorney, Agent, or Firm*—Bierman and Muserlian

[57] ABSTRACT

A friction device, in particular for belt tensioners for driving auxiliary units of internal combustion engines, comprising a housing (1), a pressure disk (17, 20, 21) and arranged therebetween, a friction disk (19), the pressure disk (17, 20, 21) and the friction disk (19) being rotatable with respect to each other and an axial force acting between the pressure disk (17, 20, 21) and the housing (1) via the friction disk (19), characterized in that at least one end face of the friction disk (19) is in contact with a protruding (convex) support surface (22, 23) extending towards it.

13 Claims, 1 Drawing Sheet

FRICTION DEVICE, IN PARTICULAR FOR BELT TENSIONERS

STATE OF THE ART

Friction devices, in particular for belt tensioners for driving auxiliary units of internal combustion engines, having a housing, a pressure disk and, arranged therebetween, a friction disk, the pressure disk and the friction disk being rotatable with respect to each other and an axial force acting between the pressure disk and the housing via the friction disk are known from DE-OS 32 25 411. In this known device, a pressure spring made as a coil spring acts in the peripheral direction to produce a tensioning force for a belt, while the pressure force of the spring effective in the axial direction can be utilized to produce the friction required at the friction disk for damping the movement of the pivoted lever. A comparable tensioning device is also described in U.S. Pat. No. 4,557,707.

In these known tensioning devices in which the friction disks are made as circular rings with parallel end faces extending in radial planes, the moment of friction for effecting frictional damping is determined by the pressing force of the friction disk against its supporting surface, by the mean radius of friction and the coefficient of friction of the friction pairing. The pressing force produced by the spring can be set and maintained with a high degree of exactness. The coefficient of friction depends on the materials constituting the friction pairing and is therefore also quite exactly maintainable. The radius of friction depends on the surface pressure distribution and reacts very sensitively to shape defects in the friction disks. A uniform distribution of surface pressure both in the radial as well as in the peripheral direction, however, calls for absolutely even and parallel friction surfaces, and this is extremely difficult to achieve in practice.

OBJECTS OF THE INVENTION

It is an object of the invention to provide a friction device having a mean radius of friction which is independent of shape and positional defects in the paired friction surfaces to the highest possible degree.

It is another object of the invention to provide a new friction disk or a new friction lining which requires a certain running-in phase before the full friction effect is obtained whereby the wearing-in phase is accelerated.

These and other objects and advantages of the invention will become obvious from the following detailed description.

THE INVENTION

The friction device of the invention, particularly for belt tensioners for driving auxiliary units of internal combustion engines, comprising a housing (1), a pressure disk (17, 20, 21) and arranged therebetween, a friction disk (19), the pressure disk (17, 20, 21) and the friction disk (19) being rotatable with respect to each other and an axial force acting between the pressure disk (17, 20, 21) and the housing (1) via the friction disk (19), is characterized in that at least one end face of the friction disk (19) is in contact with a protruding (convex) support surface (22, 23) extending towards it.

The fact that at least one end face of the friction disk is in contact with a protruding (convex) support surface extending towards it achieves the desired results. By virtue of this shape of the support surface, shape and positional defects of the friction disk are largely neutralized.

The protruding support surface can be advantageously provided on a special pressure disk fixed to the tension roller support. The pressure disk with the protruding support surface can, for instance, have a convex or roof-shaped cross-section, so that at the beginning of the friction process, when the contact surfaces between the friction disk and the pressure disk are very small, a high initial surface pressure and consequently high initial wear are obtained leading to a rapid shape match between the friction surfaces. During this process, surface pressure reduces due to the enlarging contact surfaces so that further excessive wear is stopped and after a short running-in phase, the entire mutually facing surfaces are effective for the production of the moment of friction.

Known friction devices are fixed by a single central screw to the engine block so that an additional structural measure is required to prevent the tensioner housing from rotating with respect to the engine block. The axis of the screw forms the pivoting axis of the tension roller support. The pivoted lever engages the free end of the screw facing away from the engine, and as a result of the belt tension, exerts a moment on the screw which consequently has to be made with suitably large dimensions.

In accordance with the invention, the pivoted lever of the tension roller support is fixed to one end of a shaft for example by welding or swaging, the shaft being pivotably mounted in a bearing bushing connected to and projected from the housing. In this way, the loads exerted on the components of the tensioning device are reduced because moments occurring at the shaft due to the belt tension are intercepted by the bearing bushing. For this purpose, the bearing bushing can advantageously comprise stiffening ribs on its exterior. According to one embodiment of the invention, a pressure disk acting axially on the friction disk is secured to the end of the shaft facing away from the pivoted lever. A particularly stable structure is obtained if the bearing bushing is made in one piece with the housing. The shaft of the tension roller support can be mounted within the bearing bushing on rolling bearings.

Advantageously, the housing and/or the pivoted lever each comprises an end wall having a helically convoluted surface corresponding to the pitch of the pressure spring and serving to axially support the pressure spring. This structural provision for the clamping of the spring results in a uniform transmission of the axial forces of the pressure spring over the entire periphery of the spring. The helically convoluted surfaces of the end wall of the housing and/or of the pivoted lever can each be arranged in the region of a cylindrical recess concentric with the axis of the bearing bushing so that the axial force produced by the pressure spring acts concentrically and buckling of the spring is excluded. A reliable means of fixing the tensioning device on the engine consists in providing at least two spaced mounting holes on the housing through which screws can be inserted.

REFERRING NOW TO THE DRAWINGS

Figure 2:
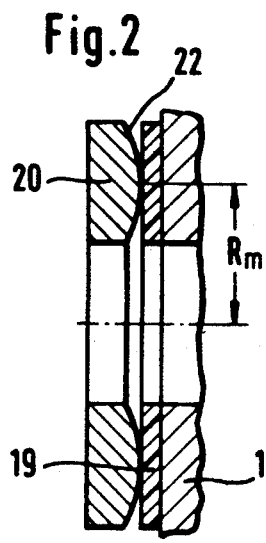
Figure 3:
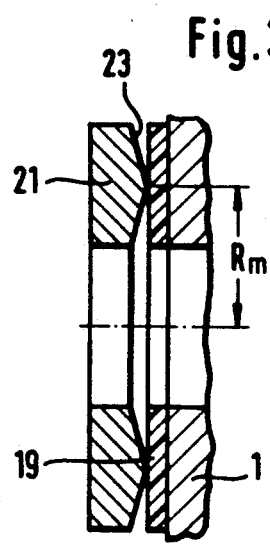
Figure 4:
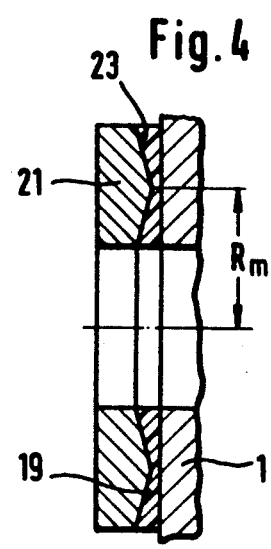

FIG. 1 is a longitudinal axial cross-section of a belt tensioning device of the invention, FIG. 2 is an axial cross-section showing a friction device comprising a convex pressure disk at the beginning of the friction process, FIG. 3 is an axial cross-section showing a friction device comprising a roof-shaped pressure disk at the beginning of the friction process, and FIG. 4 is a representation of the friction device of FIG. 3 at the end of the running-in phase.

The belt tensioning device of FIG. 1 comprises a housing 1 having two spaced mounting holes 2 for fixing the housing on the engine block. A bearing bushing 3 projecting from the housing 1 is made in one piece therewith and is provided on its exterior with stiffening ribs 4 having parallel axes. The bearing bushing 3 serves to pivotably mount a shaft 5 on rolling bearings 6. A pivoted lever 7 is welded to one end of the shaft 5 and carries a bearing 8 on its free end for tension roller 9 whose axis is parallel to the axis of the shaft 5. The shaft 5 and the pivoted lever 7 thus constitute a tension roller support 10 which can pivot in the bearing bushing 3 about its pivoting axis 11 which is the axis of rotation of the shaft 5, whereby the tension roller exerts a variable tensioning force on a tension belt.

To produce the tensioning force, the device comprises a pressure spring 12 made as a coiled cylindrical pressure spring which concentrically surrounds the bearing bushing 3. The pressure spring 12 is supported axially at one of its ends on the pivoted lever 7 and at its other end on the housing 1. To assure a uniform contact of the respective last turns of the spring, end walls 14 and 16 are provided within cylindrical recesses 13 and 15 made in the housing 1 and the pivoted lever 7 respectively, each of the end walls having a helically convoluted surface corresponding to the pitch of the pressure spring. In the peripheral direction, the pressure spring 12 produces a tensioning force for the belt bearing against the tension roller 9 and in the axial direction, the pressure spring 12 produces a pressure force urging the tension roller support 10 out of the bearing bushing 3.

A pressure disk 17 is arranged within a recess 18 of the housing 1 and is secured to the end of the shaft 5 facing away from the pivoted lever 7. On the front end of the housing 1 facing away from the pressure spring 12, a friction disk 19 is located against which the pressure disk 17 bears and on which the pressure disk 17 exerts a force resulting from the axial action of the pressure spring 12. This arrangement constitutes the frictional component of the device and serves to damp the pivoting movements of the tension roller support 10 during operation.

As compared to this frictional component, the frictional components shown in FIGS. 2 to 4 are modified to the effect that their pressure disks 20 and 21 have support surfaces protruding towards the friction disk 19. The pressure disk 20 thus appears slightly convex in axial section and has a curved support surface 22 (FIG. 2) while the pressure disk 21 has a roof-shaped appearance in axial section, i.e., it has a support surface 23 whose partial surfaces have a rectilinear appearance in cross-section (FIGS. 3 and 4). By virtue of these protruding (convex) support surfaces, very small contact surfaces exist at the beginning of the friction process between the friction disk 19 and the pressure disk 20 or 21 as the case may be, with a clearly defined mean radius of friction $R_m$. FIG. 4 shows the state obtained with a protruding pressure disk 21 and a friction disk 19 paired therewith after the end of the running-in phase. The entire mutually facing surfaces of the friction pairing are now in contact with one another and are effective for the production of the moment of friction.

Various modifications of the friction device of the invention may be made without departing from the spirit or scope thereof and it is to be understood that the invention is intended to be limited only as defined in the appended claims.

What we claim is:

1. A friction device, in particular for belt tensioners for driving auxiliary units of internal combustion engines, comprising a housing (1), a pressure disk (17, 20, 21) and arranged therebetween, a friction disk (19), the pressure disk (17,20,21) and the friction disk (19) being rotatable with respect to each other and an axial force acting between the pressure disk (17,20,21) and the housing (1) via the friction disk (19), characterized in that at least one end face of the friction disk (19) is in contact with a protruding (convex) support surface (22,23) extending towards it which is formed on a pressure disk (20,21) retained by a tension roller support (10).

2. A friction device of claim 1 wherein the device comprises a tension roller support (10) pivotable relative to the housing (1) and provided with a pivoted lever (7) on which a tension roller (9) is rotatably mounted, the device further comprising a pressure spring (12) coaxial with a pivoting axis (11) of the tension roller support (10) and axially supported at one of its ends against the housing (1) and at its other end against the tension support (10), and a frictional component which serves to damp the pivoting movement of the tension roller support (10) and which is provided with a friction disk (19) supported on the housing (1) and axially loaded by the pressure spring (12) via the pivoted lever (7) which is fixed on one end of a shaft (5) which is pivotably mounted in a bearing bushing (3) connected to and projecting from the housing (10).

3. A friction device of claim 2 wherein a pressure disk (17) acting axially on the friction disk (19) is secured to the end of the shaft (5) facing away from the pivoted lever (7).

4. A friction device of claim 3 wherein the shaft (5) is axially supported via the pressure disk (17) and the friction disk (19) on the front end of the housing (1) facing away from the pivoted lever (7).

5. A friction device of claim 4 wherein the housing (1) comprises a recess (18) in which the friction disk (19) and the shaft end carrying the pressure disk (17) are arranged.

6. A friction device of claim 2 wherein stiffening ribs (4) are provided on the exterior of the bearing bushing (3).

7. A friction device of claim 6 wherein the bearing bushing (3) is made in one piece with the housing (1).

8. A friction device of claim 2 wherein the bearing bushing (3) is made in one piece with the housing (1).

9. A friction device of claim 2 wherein the shaft (5) of the tension roller support (1) is mounted within the bearing bushing (3) on rolling bearings (6).

10. A friction device of claim 1 wherein the pressure disk (20) is convex in cross-section.

11. A friction device of claim 1 wherein the pressure disk (21) is roof-shaped in cross-section.

12. A friction device of claim 1 wherein at least one of the housing (1) and the pivoted lever (7) each comprises an end wall (14,16) serving to axially support the pressure spring (12).

13. A fiction device of claim 12 wherein the the end wall (14, 16) of the housing (1) and/or of the pivoted lever (7) is arranged in the region of a cylindrical recess (13, 15) which is concentric with the axis of the bearing bushing (3).

* * * * *